United States Patent
Narayanasamy et al.

(10) Patent No.: US 12,147,376 B2
(45) Date of Patent: Nov. 19, 2024

(54) EFFICIENT TRANSMISSION OF VIDEO AND AUDIO OVER SLAVE FIFO INTERFACE

(71) Applicant: Cypress Semiconductor Corporation, San Jose, CA (US)

(72) Inventors: Rajagopal Narayanasamy, Bangalore (IN); Ashwin Nair, Ernakulam (IN); Harsh Vinodchandra Gandhi, Nadiad (IN); Sanat Kumar Mishra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 99 days.

(21) Appl. No.: 18/190,708

(22) Filed: Mar. 27, 2023

(65) Prior Publication Data

US 2024/0330229 A1    Oct. 3, 2024

(51) Int. Cl.
*G06F 13/42* (2006.01)
*G06F 13/38* (2006.01)
*H04N 5/926* (2006.01)
*H04N 21/4363* (2011.01)

(52) U.S. Cl.
CPC ........ *G06F 13/4282* (2013.01); *G06F 13/385* (2013.01); *H04N 5/9265* (2013.01); *H04N 21/43635* (2013.01); *G06F 2213/0042* (2013.01)

(58) Field of Classification Search
CPC ............. G06F 13/4282; G06F 13/385; G06F 2213/0042; H04N 21/43635; H04N 5/9265
See application file for complete search history.

(56) References Cited

U.S. PATENT DOCUMENTS

| | | | |
|---|---|---|---|
| 8,010,692 B1 * | 8/2011 | Shanson | H04N 21/4402 375/240.12 |
| 9,769,417 B1 * | 9/2017 | Yarygin | H04N 7/083 |
| 10,645,199 B2 * | 5/2020 | Huang | H04N 21/43635 |
| 2011/0234902 A1 * | 9/2011 | Shenoi | H04L 7/005 348/E5.009 |
| 2016/0366470 A1 * | 12/2016 | Rabii | H04N 21/43635 |
| 2019/0230196 A1 * | 7/2019 | Huang | H04L 69/18 |

OTHER PUBLICATIONS

Future Technology Devices International Ltd. (FTDI Chip), New UVC Class SuperSpeed USB Bridge Demo, 2 pages.
Etron Technology, Inc., EJ511 Datasheet, USB3.1 Gen1 Video Capture IC, Rev. 0.97, 5 pages.

* cited by examiner

*Primary Examiner* — Henry Tsai
*Assistant Examiner* — Christopher A Daley

(57) ABSTRACT

Systems and methods for translation and transmission of video and audio data over a first-in-first-out interface (FIFO) in a field programmable gate array (FPGA) are provided. The method includes receiving audio and video data including a number of video frames, each with a plurality of video lines separated by a line blanking interval. A first video line is translated and transmitted to a packet-based network through the FIFO in the FPGA while concurrently buffering the audio data in an audio buffer in the FPGA. Next, at least a portion of the audio data in the audio buffer is transmitted to the packet-based network through the FIFO during the line blanking interval separating the first video line from a second video line. Where video frames are separated by frame blanking intervals the method further includes transmitting through the FIFO any data remaining in the buffer after the preceding line blanking interval.

22 Claims, 7 Drawing Sheets

EFFICIENT TRANSMISSION OF VIDEO AND AUDIO OVER SLAVE FIFO INTERFACE

TECHNICAL FIELD

This disclosure relates generally to translation and transmission of video and audio data, and more particularly to systems and methods for translation and transmission of video and audio data over (FIFO) interface.

BACKGROUND

It is frequently desirable to connect an uncompressed video from a multi-media source, such as a video camera, video player, game console or streaming device, to a display or recording device via a packet-based network, such as a Universal Serial Bus. FIG. 1A is a block diagram of a conventional system 100 for translating and transmitting video and audio data from a multi-media source 102 to a Universal Serial Bus (USB 104) or USB interface.

Referring to FIG. 1A the system 100 includes a Field Programmable Gate Array (FPGA 106) and a USB controller 108. The FPGA 106 is configured to receive video and associated audio data from the multi-media source 102, and generally includes a high bandwidth parallel interface, such as a First-In-First-Out (FIFO) interface 110 to combine and transmit the video and audio data over a parallel or FIFO bus 112. The USB controller 108 is configured to receive the parallel data from the FIFO bus 112, and convert the data into USB data packets, which are then transmitted or coupled over the USB 104 to a USB compatible display or recording device.

The FPGA 106 further includes a video data decoder 114 configured to receive video data and frame valid signals from an image sensor 116 in the multi-media source 102, an audio data decoder 118 to receive audio data from a microphone 120 in the multi-media source, a video buffer 122 coupling the video data decoder to the FIFO interface 110, and an audio buffer 124 coupling the audio data decoder to the FIFO interface. Since the FPGA 106 must transfer video and audio data to the USB controller 108 using the single FIFO interface 110, and both audio and video are real-time data, the video buffer 122 and audio buffer 124 are required to buffer this data for sequential, interleaved transmission at regular intervals.

FIG. 1B is a timing diagram of a video and audio data and signals from the multi-media source 102 and an output from the FIFO interface 110 of the system 100 of FIG. 1A. Referring to FIG. 1B it is seen, video data is transmitted from the multi-media source as individual video frames, each made up of a number of lines of image data. To maintain integrity of each video frame a frame valid signal is transmitted from the multi-media source to indicate the beginning and end of each video frame. The interval between the end of one video frame and the beginning of another is referred to as video frame blanking. Conventionally, this interval between video frames is used by the system 100 to transmit audio data through the FIFO interface 110. Thus, the audio buffer 124 must store audio data until the video frame blanking interval. For example, video frame blanking occurs once in 33.3 milliseconds (ms) for a 30 frames-per-second (fps) video, so the audio buffer 124 must have sufficient buffer memory to store audio data for at least 33.3 ms.

Additionally, the video buffer 122 and the audio buffer 124 frequently need to buffer data for a number of video frames and the associated audio data to support any throughput variations arising from delays in the FIFO interface 110 and USB controller 108, resulting in the need for even larger buffer memories. This is significant since the cost of FPGAs 106 including large embedded memory adds substantially to the cost of the system 100.

FIG. 1C is a block diagram of another system 100' for translating and transmitting video and audio data from the multi-media source to the USB 104 including an FPGA 106' including an inter-integrated circuit sound ($I^2S$) interface 126 and $I^2S$ serial bus 128, to transmit audio data from the audio buffer 124 to the USB controller 108. This approach eliminates the need to limit transmission of audio data to video frame blanking intervals. However, the need to buffer both audio and video data to support throughput variation remains, and the added $I^2S$ interface 126 as well as the need for a USB controller capable of supporting both a FIFO and $I^2S$ interfaces adds substantially to the cost and complexity of the system 100'.

Accordingly, there is a need for a system and method for translating and transmitting video and audio data from a multi-media source to USB through an FPGA including a FIFO interface, without the need for large embedded memory. It is further desirable, that the system and method not require additional interfaces in the FPGA or a USB controller for separate transmission of audio data.

SUMMARY

Systems and methods for translation and transmission of video and audio data over a first-in-first-out (FIFO) interface are provided. Generally, the method includes receiving in a field programmable gate array (FPGA) audio data, and video data including a number of video frames, each with a plurality of video lines separated by a line breaking or blanking interval. A first of the plurality of video is translated and transmitted to a packet based network through a single FIFO interface in the FPGA while concurrently buffering the audio data in an audio buffer in the FPGA. Next, at least a portion of the audio data in the audio buffer is transmitted to the packet based network through the FIFO interface during the line blanking interval separating the first video line from a second video line. Where each video frame in the video data received is separated from a succeeding video frame by a frame blanking interval, and the method further includes translating and transmitting to the packet based network through the FIFO interface any audio data in the audio buffer not translated and transmitted during an immediately preceding line blanking interval during the frame blanking interval separating a first video frame from a second video frame.

In some embodiments, the system is a universal serial bus (USB) bridge including a FPGA with a single FIFO interface operable for translating and transmitting video and audio data from a HDMI source to a USB controller. The system further includes a universal serial bus (USB) controller coupled between the FPGA and a USB network. Generally, the FPGA further includes a video data decoder operable to decode video data from a multi-media source, an audio data decoder operable to decode audio data from the multi-media source, and an audio buffer coupled to the audio data decoder. The FIFO interface is operable to translate and transmit a first video line of the plurality of video lines to a USB network through the USB controller while concurrently buffering the audio data received in the audio buffer, and to translate and transmit at least a portion of the audio data in the audio buffer to the USB network during the line blanking interval separating the first video line from a second video line in the video frame.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A system and methods are provided for translating and transmitting video and audio data from a multi-media source to a Universal Serial Bus (USB) over a slave First-in-First-out (FIFO) Interface. The system and methods of the present disclosure are particularly useful for translating and transmitting video and audio data from a High-Definition Multimedia Interface (HDMI) source to a USB.

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to 'couple' as used herein can include both to directly electrically connect two or more components or elements and to indirectly connect through one or more intervening components.

Figure 1A:
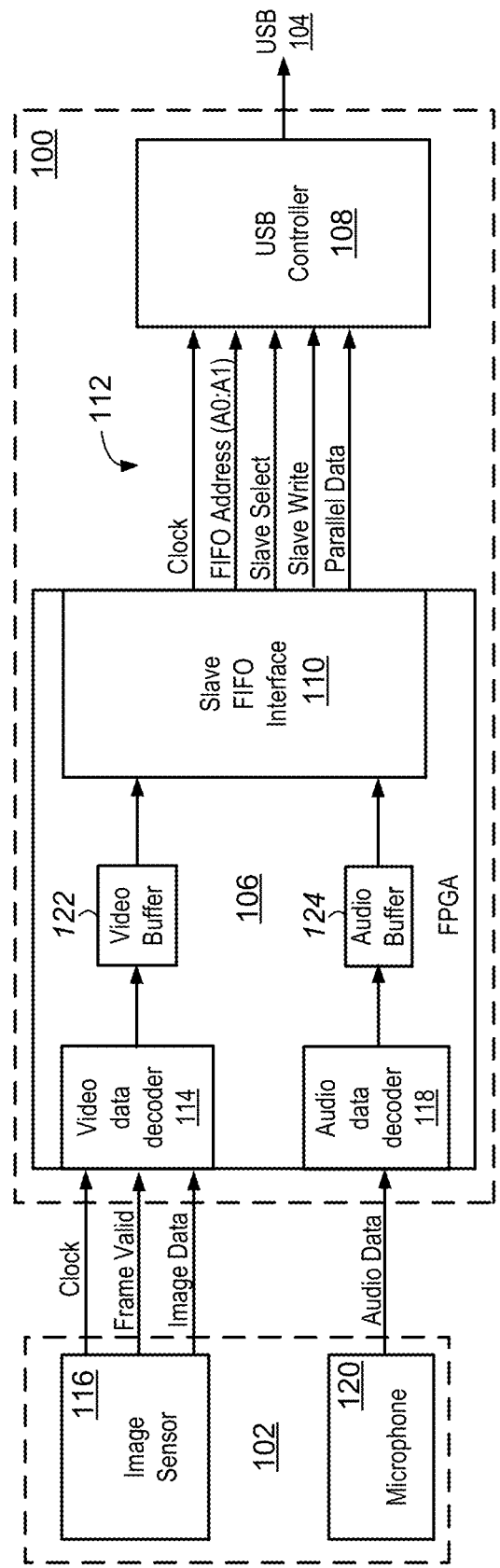
FIG. 1A is a block diagram of a system including a Field Programmable Gate Array (FPGA) with a First-in-First-out (FIFO) interface for translating and transmitting video and audio data from a multi-media source to a Universal Serial Bus (USB) using a conventional method.
Figure 1B:
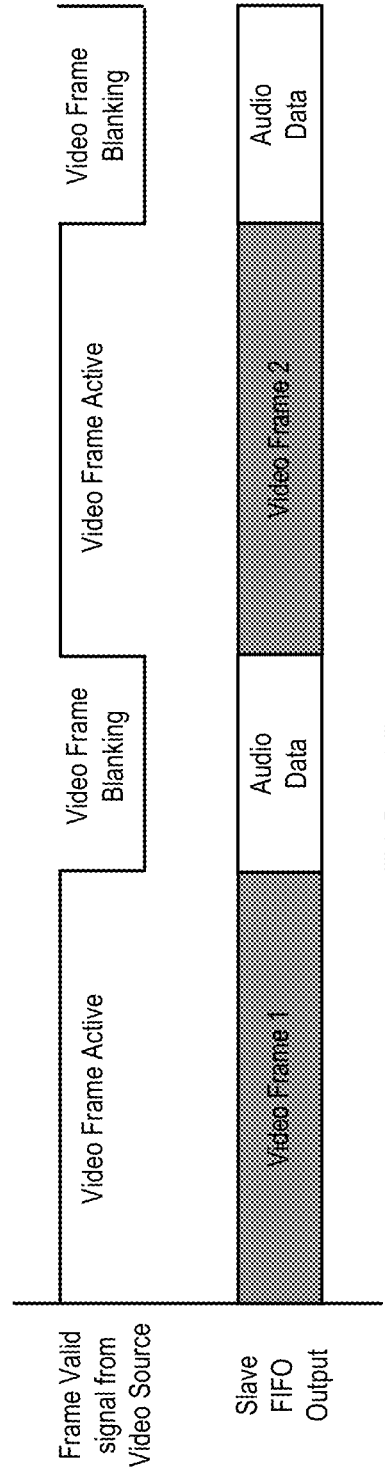
FIG. 1B is a timing diagram of a video and audio data and signals from the multi-media source and FIFO output from the system of FIG. 1A.
Figure 1C:
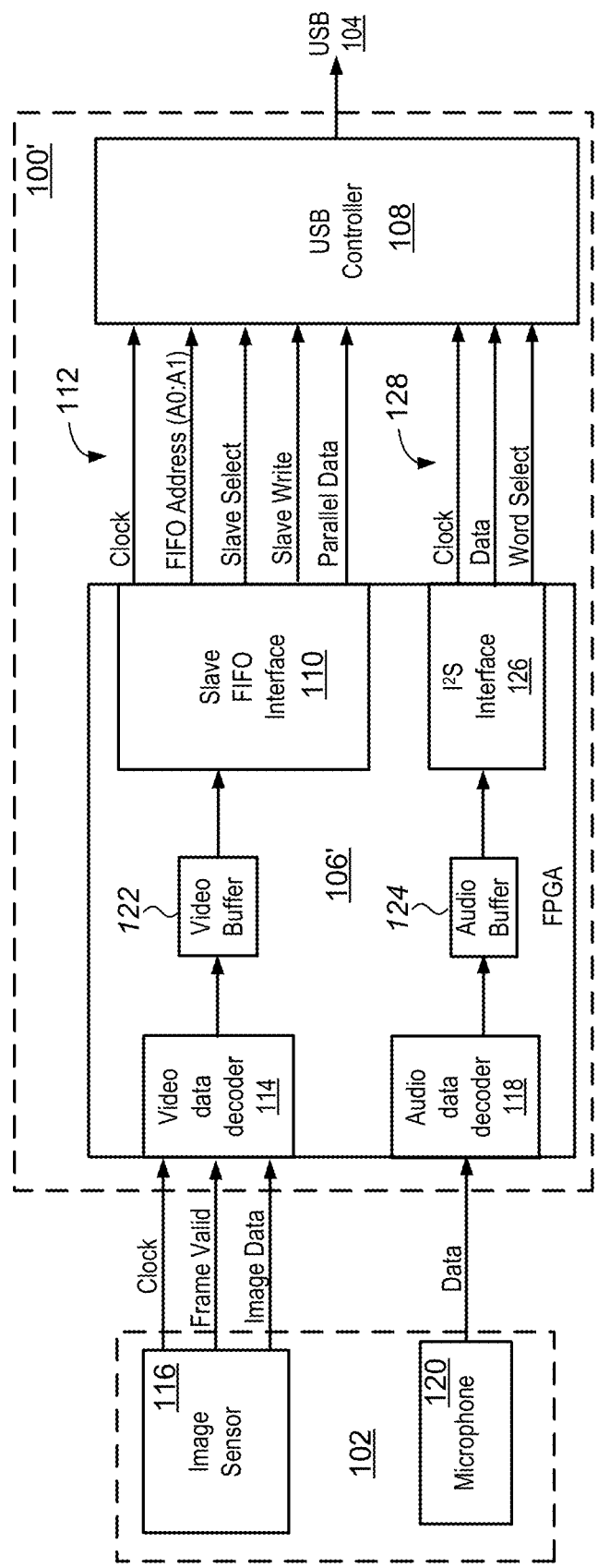
FIG. 1C is a block diagram of another system for translating and transmitting video and audio data from a multi-media source to a USB including an inter-integrated circuit sound (I2S) serial bus, to communicate audio data.
Figure 2:
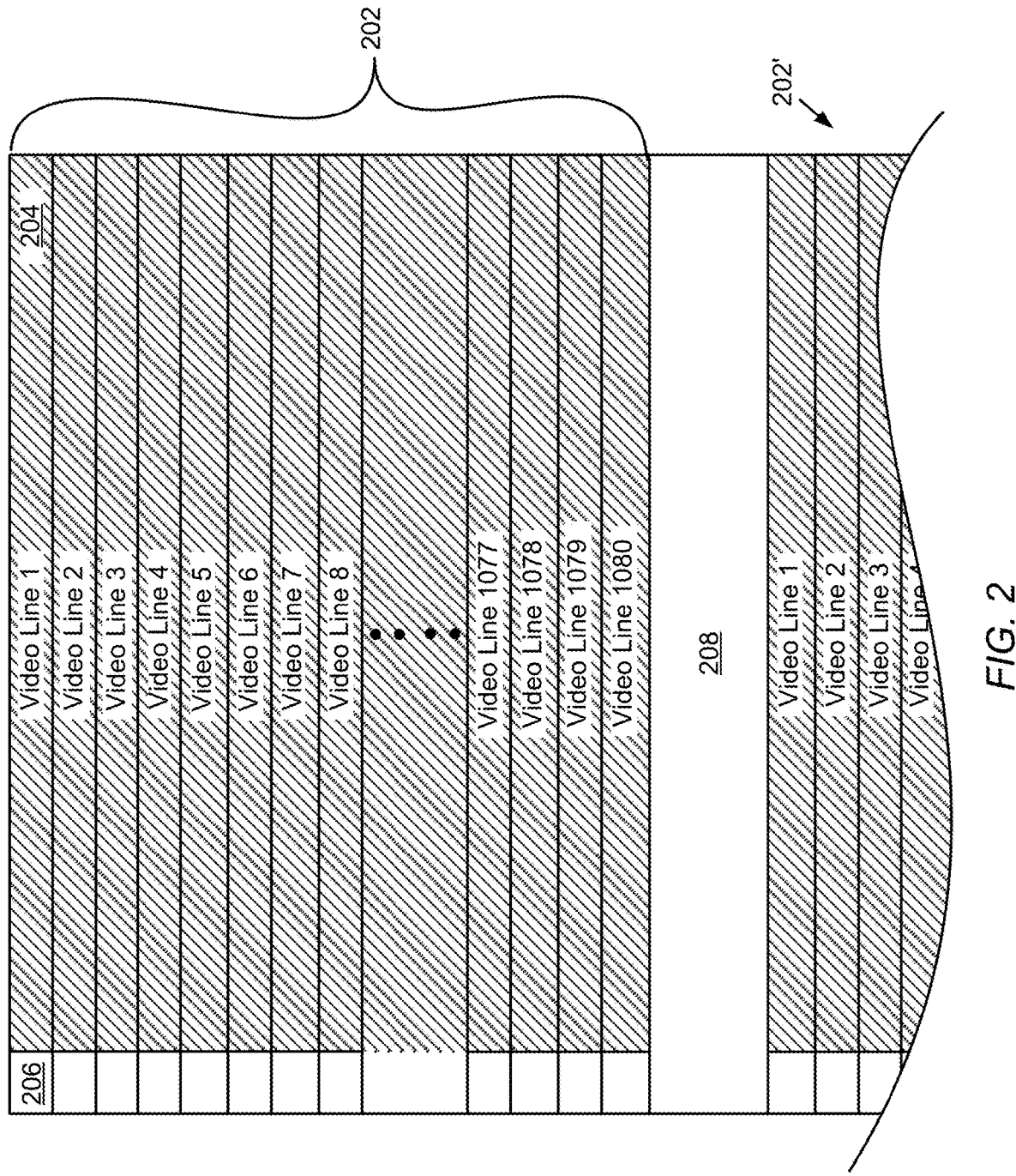
FIG. 2 is a block diagram illustrating a timing relationship of line-breaks and frame-breaks, for a single frame of High-Definition Multimedia Interface (HDMI) video data.

The present disclosure describes a system and method for efficiently translating and transmitting audio and video data in an uncompressed format, such as High-Definition Multimedia Interface (HDMI) format, through a slave (FIFO) interface to a packet based network, such as a Universal Serial Bus (USB) network. Briefly, the method involves interleaving audio data over video data more periodically than in conventional systems and methods by transmitting buffered audio data during every video line breaking or blanking time or interval, rather than solely between each video frame. FIG. 2 is a block diagram illustrating a timing relationship of line blanking intervals and frame blanking intervals for a single frame of High-Definition Multimedia Interface HDMI video data. Referring, to FIG. 2, each frame of video data or video frame 202 includes multiple lines of video data or video lines 204, which are transmitted through a HDMI interface sequentially from top to bottom of the video frame and separated during transmission by line blanking intervals 206. Each video frame 202 is further separated from a second, sequentially transmitted video frame 202' by a frame blanking interval 208. The number of pixels (not shown) of imaging data in each video line 204 and the number video lines in each video frame 202 depend on a size and resolution of video being transmitted. The duration or time period of the line blanking intervals 206 and the frame blanking intervals 208 depend on a frame rate of the video being transmitted. For example, for a video with a typical full high definition (FHD) resolution, each video frame 202 includes 1080 video lines 204 of 1920 pixels each, sent at 30 frame per second (fps), the line blanking intervals 206 are about 3.78 microseconds (µs) and the frame blanking intervals 208 are about 1.33 milliseconds (ms).

Figure 3:
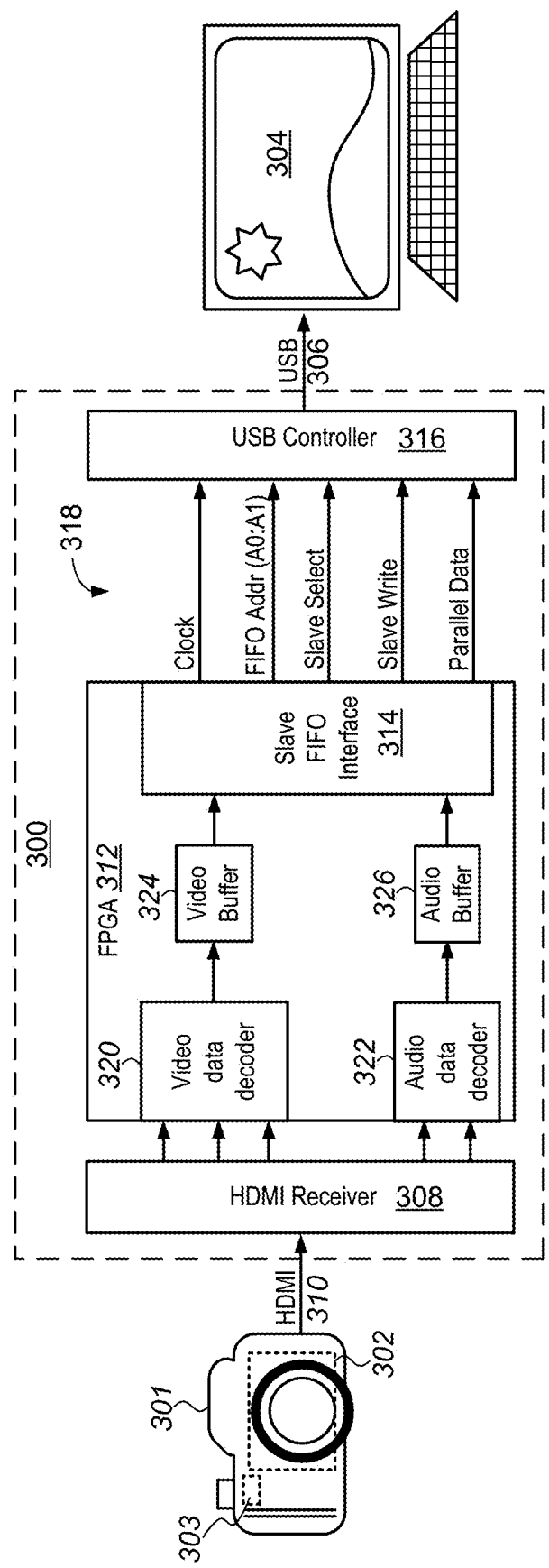
FIG. 3 is a block diagram of a USB bridge including a FPGA with a FIFO interface operable for translating and transmitting video and audio data from a HDMI source to a USB using the method of the present disclosure.

FIG. 3 is a block diagram of a USB bridge circuit or system 300 operable to translate and transmit video and audio data from a multi-media source 301 including an image senor 302 and microphone 303, such as a HDMI compatible camera, to a recording or display device 304 through a packet based network, such a USB 306, by buffering and interleaving transmission of audio data during line blanking intervals between transmission of video lines. Referring to FIG. 3, the system 300 generally includes a receiver, such as a HDMI receiver 308 coupled to the multi-media source 301 through an HDMI link 310, a field programmable gate array (FPGA 312) including a slave first-in-first-out (FIFO) interface 314, and a master controller, such as universal serial bus (USB) controller 316, coupled to the slave FIFO interface in the FPGA through a general parallel interface (GPIF 318). Generally, the GPIF 318 includes a clock signal, a number of FIFO addresses, and slave select, slave write and parallel data signals, through which the FPGA 312 can control the slave FIFO interface 314.

The FPGA 312 includes in addition to the slave FIFO interface 314 a video data decoder 320 and an audio data decoder 322 coupled to the HDMI receiver 308. The video data decoder 320 is coupled to the slave FIFO interface 314 through a video buffer 324, and is operable to receive image data and signals including frame valid and line valid signals from the multi-media source 301 through the HDMI receiver 308, and to translate or decode the image data and signals to generate video data, which is then communicated or transmitted to the slave FIFO interface through the video buffer. The video buffer 324 is operable to store or buffer at least a portion of the video data to support delays in transmission through the slave FIFO interface 314, USB controller 316 and/or the packet based network i.e., USB 306. Thus, a memory size of the video buffer 324 is selected based on the video frame rate a number of pixels in each video line and on the number of video lines in each video frame. Generally, the video buffer 324 is sized to support a wide range of video frame rates, and variable frame rates, up to and including HD video at 60 fps. For example, in one embodiment the video buffer 324 includes sufficient embedded memory to provide uninterrupted stream of 30 frames of FHD video data, i.e., 1080 video lines of 1920 pixels. By variable frame rates it is meant that the frame rate at which the video received can change during the reception of a single uninterrupted video.

The audio data decoder 322 is also coupled to the slave FIFO interface 314 through an audio buffer 326, and is operable to receive audio data, for example in the form of pulse-density modulation (PDM) data, from the multi-media source 301 through the HDMI receiver 308, and to translate or decode the PDM data to generate audio data, and to communicate or transmit the audio data to the slave FIFO interface through the audio buffer. The audio buffer 326 is operable to store or buffer decoded audio data associated with at least one line of video data while the line of video data is being translated and transmitted. Thus, an embedded memory size of the audio buffer 326 is selected based on a quanta in bytes of audio data associated with each line of video data received and transmitted, which in turn can depend on a number of channels and a sampling frequency of the audio data, and a time required to decode and transmit a line of video data, also known as the line active portions or time. The size of the embedded memory of the audio buffer 326 may be further selected based of the number of bytes that can be transmitted during the line blanking interval between lines of video data. For example, where the video data being received is in FHD at 30 fps, the line active time for each line of video data is about 1 ms, and the line blanking interval is about 3.78 μs. Thus, where the audio data includes 2 channels at a sampling frequency of 48 kHz the size of the audio buffer 326 required to store or buffer the audio data associated with each line of video data, is a minimum of about 192 bytes or about 1.5 kbits. However, it will be understood that the embedded memory may be considerably larger to support delays in transmission through the slave FIFO interface 314.

The slave FIFO interface 314 includes logic elements to execute an algorithm to interleave the video and audio data received from the video buffer 324 and audio buffer 326, and to communicate or transmit the video and audio data to the USB controller 316 through the GPIF 318.

Figure 4:
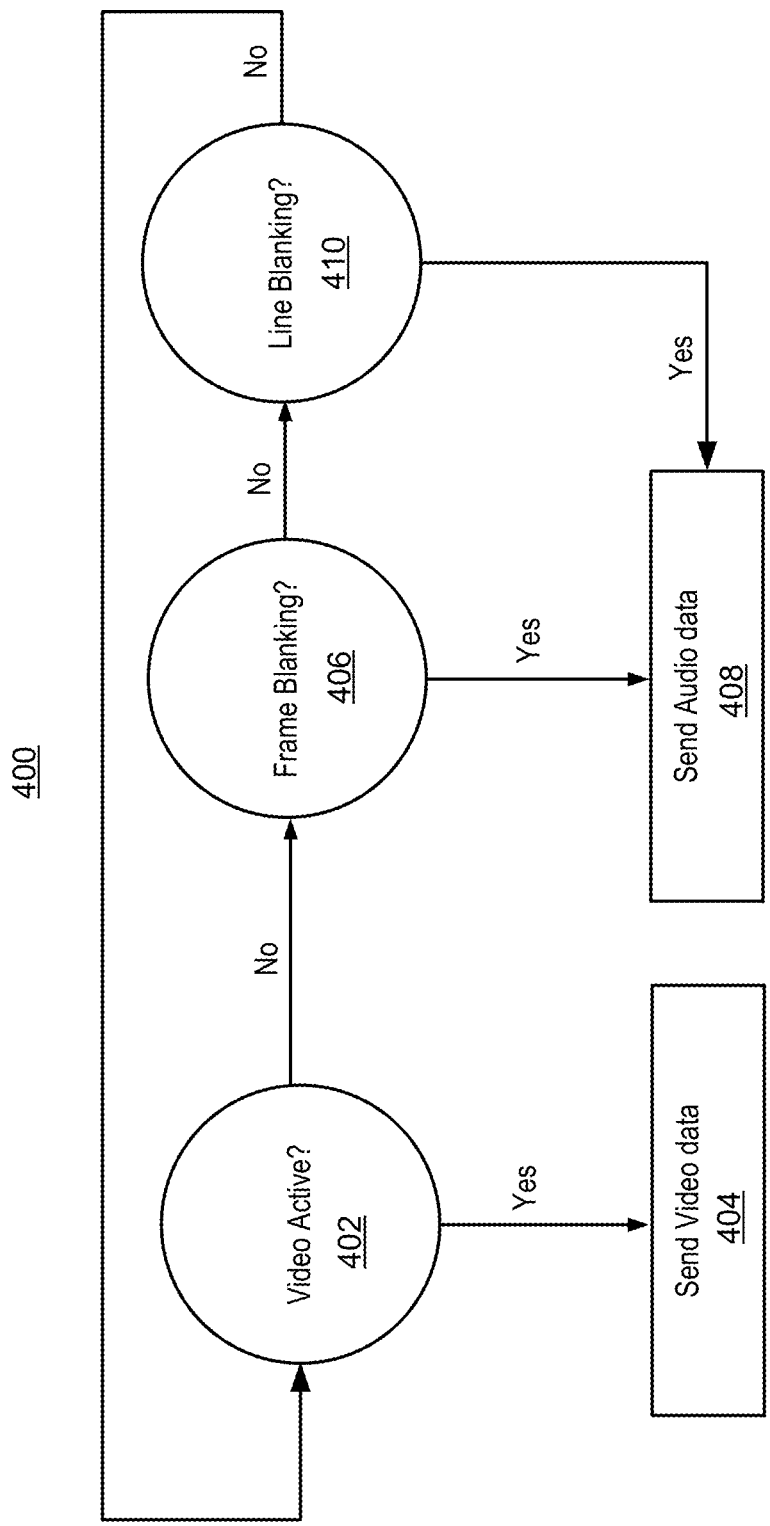
FIG. 4 is a state machine diagram illustrating a method for transmitting video and audio data while minimizing usage of audio buffer memory.

An embodiment of the algorithm is for transmitting video and audio data while minimizing the required embedded memory size the audio buffer 326 is illustrated in the state machine diagram of FIG. 4. Referring to FIG. 4, the algorithm 400 begins with determining if the video is active (video active 402). That is whether or not video data has or is being decoded by the video data decoder 320 and is being communicated or transmitted through the video buffer 324 to the slave FIFO interface 314. If the video is active, the slave FIFO interface 314 communicates or transmits the video data to the USB controller 316 over the GPIF 318 (send video data 404). If the video is not active, a determination is made as if there is a frame blanking interval (frame blanking 406). If there is a frame blanking interval, the slave FIFO interface 314 communicates or transmits any audio data stored or buffered in the audio buffer 326 to the USB controller 316 (send audio data 408). If there is not a frame blanking interval, a determination is made as if there is a line blanking interval (line blanking 410). If there is a frame blanking interval, the slave FIFO interface 314 communicates or transmits at least a portion of the audio data stored or buffered in the audio buffer 326 to the USB controller 316 over the GPIF 318 (send audio data 408), and if not the slave FIFO interface is configured or reconfigured to check for video active 402.

Figure 5:
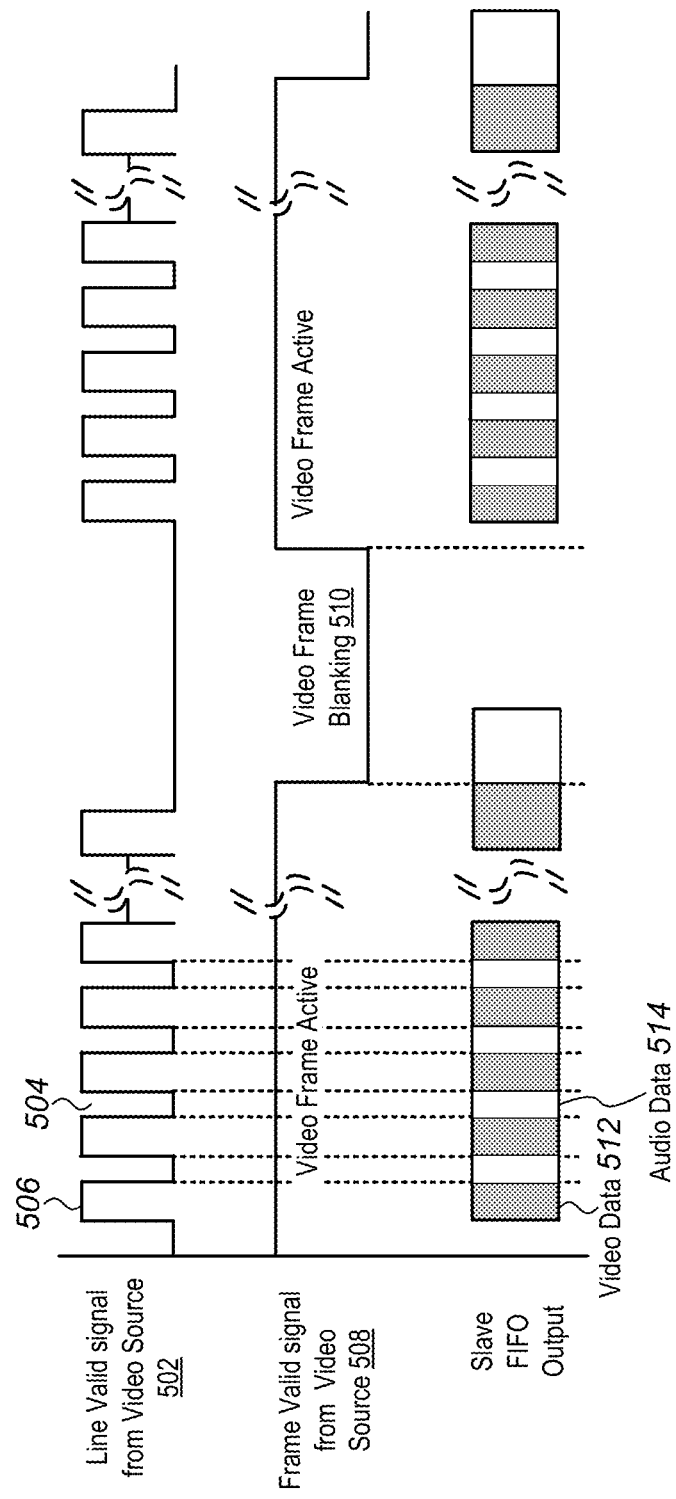
FIG. 5 is a timing diagram of a video and audio data and signals from the HDMI source and FIFO output from the USB bridge of FIG. 3.
Figure 6:
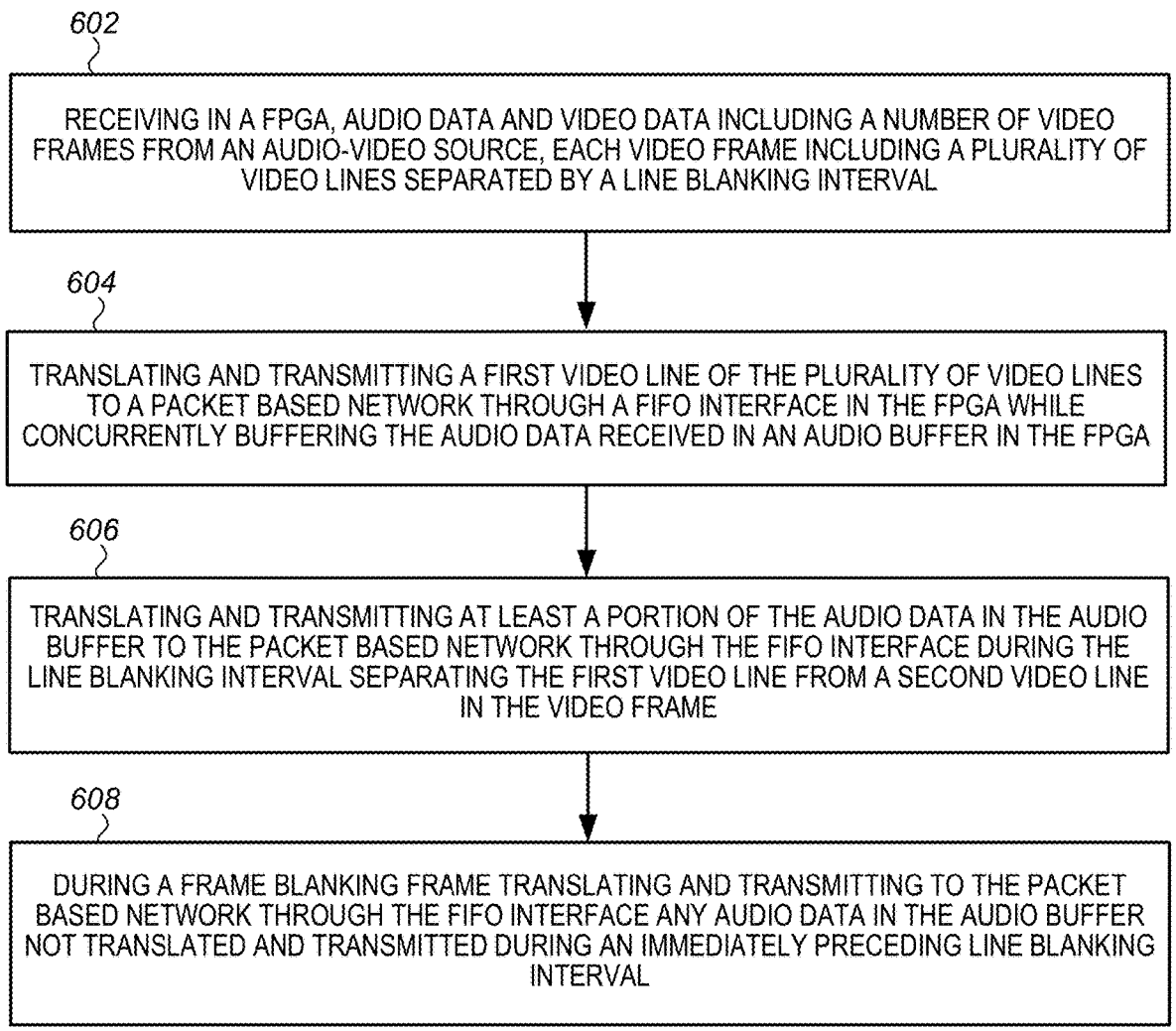
FIG. 6 is a flowchart illustrating a method for translating and transmitting video and audio data from an HDMI source to a USB over a FIFO Interface.

A method of operating the system of FIG. 3 to translate and transmit video and audio data from a multi-media source to a recording or display device through a packet based network, while buffering and interleaving transmission of audio data during line blanking intervals between transmission of video lines will now be described with reference to FIGS. 5 and 6. FIG. 5 is a timing diagram of a video and audio data and signals from the HDMI source and FIFO output from the USB bridge of FIG. 3. FIG. 6 is a flowchart illustrating a method for translating and transmitting video and audio data from an HDMI source to a USB over a FIFO Interface.

Referring to FIGS. 5 and 6, the method begins with receiving in the FPGA from a multi-media source video data and audio data (step 602). Generally, the video data contains both imaging data including a number of video frames, each with multiple video lines, a line valid signal 502 to indicate line blanking portions or intervals 504 separating line active portions 506, and a frame valid signal 508 to indicate frame blanking intervals 510 separating each video frame from a subsequent video frame. The audio data can include a number of channels of audio encoded using, for example, PDM modulation and a PDM clock signal.

Next, video data 512 in a first video line of the multiple video lines in a first video frame is decoded or translated, and transmitted to a packet based network through a slave FIFO interface in the FPGA, while concurrently buffering in an audio buffer audio data received and decoded in an audio data decoder in the FPGA (step 604).

At least a portion of the audio data 514 stored in the audio buffer is transmitted to the packet based network through the FIFO interface during the line blanking interval 504 separating the first video line from a second video line in the video frame (step 606).

Generally, method further includes during the frame blanking interval 510 separating a first video frame from a second video frame transmitting to the packet based network through the FIFO interface any audio data 514 in the audio buffer not translated and transmitted during an immediately preceding line blanking interval 504 (step 608).

Thus, systems for translation and transmission of video and audio data over a FIFO interface in a FPGA and methods of operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method comprising:
   receiving in a field programmable gate array (FPGA) audio data and video data including a number of video frames from a multi-media source, each video frame including a plurality of video lines separated by a line blanking interval;
   translating and transmitting a first video line of the plurality of video lines to a packet based network through a first-in-first-out (FIFO) interface in the FPGA while concurrently buffering the audio data received in an audio buffer in the FPGA; and
   translating and transmitting at least a portion of the audio data in the audio buffer to the packet based network through the FIFO interface during the line blanking interval separating the first video line from a second video line in the video frame.

2. The method of claim 1, wherein receiving video data comprises receiving a line valid signal from the multi-media source, the line valid signal including a plurality of line active portions separated by line blanking intervals, and wherein:
   translating and transmitting a first video line comprises translating and transmitting the first video line beginning when one of the plurality of line active portions is received; and
   translating and transmitting at least a portion of the audio data comprises translating and transmitting the portion of the audio data beginning when one of the line blanking intervals is received.

3. The method of claim 1, wherein translating and transmitting at least a portion of the audio data comprises translating and transmitting at least a portion of the audio data over the interface during the next line blanking interval, after audio data in the audio buffer reaches a predetermined number of bytes.

4. The method of claim 1, wherein each video frame in the video data received is separated from a succeeding video frame by a frame blanking interval, and further comprising during the frame blanking interval separating a first video frame from a second video frame translating and transmitting to the packet based network through the FIFO interface any audio data in the audio buffer not translated and transmitted during an immediately preceding line blanking interval.

5. The method of claim 4, wherein the FPGA further comprises a video buffer through which the video data is coupled to the FIFO interface, and wherein the method further comprises buffering at least a portion of the video data in the video buffer to support delays in transmission through the FIFO interface and the packet based network.

6. The method of claim 1, wherein the packet based network comprises a universal serial bus (USB).

7. The method of claim 1, wherein receiving video data in the FPGA comprises receiving video data from an image sensor in the multi-media source.

8. The method of claim 1, wherein receiving video data in the FPGA comprises receiving video data from a High-Definition Multimedia Interface (HDMI) source.

9. The method of claim 1, wherein receiving video data in the FPGA comprises receiving video data at variable frame rates, up to 60 frames per second (fps).

10. A system comprising:
    a universal serial bus (USB) controller; and
    a field programmable gate array (FPGA) including:
      a video data decoder operable to receive and decode video data from a multi-media source, the video data including a number of video frames, each video frame including a plurality of video lines separated by a line blanking interval;
      an audio data decoder operable to receive and decode audio data from the multi-media source;
      an audio buffer coupled to the audio data decoder; and
      a first-in-first-out (FIFO) interface through which the FPGA is coupled to the USB controller,
      wherein the FIFO interface is operable to translate and transmit a first video line of the plurality of video lines to a USB network through the USB controller while concurrently buffering the audio data received in the audio buffer, and to translate and transmit at least a portion of the audio data in the audio buffer to the USB network during the line blanking interval separating the first video line from a second video line in the video frame.

11. The system of claim 10, wherein the video data decoder is operable to receive a line valid signal from the multi-media source, the line valid signal including a plurality of line active portions separated by line blanking intervals, and wherein the FIFO interface is operable to translate and transmit the first video line beginning when one of the plurality of line active portions is received, and to translate and transmit the portion of the audio data beginning when one of the line blanking intervals is received.

12. The system of claim 10, wherein the FIFO interface is operable to translate and transmit least a portion of the audio data over the interface during the next line blanking interval, after audio data in the audio buffer reaches a predetermined number of bytes.

13. The system of claim 10, wherein each video frame in the video data received is separated from a succeeding video frame by a frame blanking interval, and wherein the FIFO interface is operable to translate and transmit any audio data in the audio buffer not translated and transmitted during an immediately preceding line blanking interval.

14. The system of claim 13, wherein the FPGA further comprises a video buffer through which the video data is coupled to the FIFO interface, and wherein the FIFO interface is operable to buffer at least a portion of the video data in the video buffer to support delays in transmission through the FIFO interface and the USB controller.

15. The system of claim 10, wherein receiving video data in the FPGA comprises receiving video data from an image sensor in the multi-media source.

16. The system of claim 10, wherein the video data received in the FPGA comprises video data from High-Definition Multimedia Interface (HDMI) source.

17. The system of claim 10, wherein the FPGA is operable to receive video data at variable frame rates, up to 60 frames per second (fps).

18. A field programmable gate array (FPGA) comprising:
a video data decoder operable to receive and decode video data from a multi-media source, the video data including a number of video frames, each video frame including a plurality of video lines separated by a line blanking interval;
an audio data decoder operable to receive and decode audio data from the multi-media source;
an audio buffer coupled to the audio data decoder; and
a first-in-first-out (FIFO) interface through which the FPGA is coupled to a universal serial bus (USB) controller,
wherein the FIFO interface is operable to translate and transmit a first video line of the plurality of video lines to the USB controller while concurrently buffering the audio data received in the audio buffer, and to translate and transmit at least a portion of the audio data in the audio buffer to the USB controller during the line blanking interval separating the first video line from a second video line in the video frame.

19. The FPGA of claim 18, wherein the FIFO interface is operable to translate and transmit least a portion of the audio data over the interface during the next line blanking interval, after audio data in the audio buffer reaches a predetermined number of bytes.

20. The FPGA of claim 18, wherein each video frame in the video data received is separated from a succeeding video frame by a frame blanking interval, and wherein the FIFO interface is operable to translate and transmit any audio data in the audio buffer not translated and transmitted during an immediately preceding line blanking interval.

21. The FPGA of claim 20, further comprising a video buffer through which the video data is coupled to the FIFO interface, and wherein the FIFO interface is operable to buffer at least a portion of the video data in the video buffer to support delays in transmission through the FIFO interface and the USB controller.

22. The FPGA of claim 18, wherein the FPGA is operable to receive video data at variable frame rates, up to 60 frames per second (fps).

* * * * *